(12) United States Patent
Oestergaard et al.

(10) Patent No.: US 10,399,232 B2
(45) Date of Patent: Sep. 3, 2019

(54) SAFETY SYSTEM FOR INDUSTRIAL ROBOT

(71) Applicant: UNIVERSAL ROBOTS A/S, Odense S (DK)

(72) Inventors: Esben H Oestergaard, Odense S (DK); Grzegorz Zieba, Odense S (DK); David Brandt, Odense S (DK)

(73) Assignee: UNIVERSAL ROBOTS A/S, Odense S (DK)

(*) Notice: Subject to any disclaimer, the term of this patent is extended or adjusted under 35 U.S.C. 154(b) by 131 days.

(21) Appl. No.: 15/120,305

(22) PCT Filed: Feb. 26, 2015

(86) PCT No.: PCT/DK2015/050038
§ 371 (c)(1),
(2) Date: Aug. 19, 2016

(87) PCT Pub. No.: WO2015/131904
PCT Pub. Date: Sep. 11, 2015

(65) Prior Publication Data
US 2017/0057095 A1    Mar. 2, 2017

(30) Foreign Application Priority Data
Mar. 4, 2014    (DK) .................. 2014 70103

(51) Int. Cl.
*G05B 19/04* (2006.01)
*B25J 13/08* (2006.01)
(Continued)

(52) U.S. Cl.
CPC .......... *B25J 13/088* (2013.01); *B25J 9/1674* (2013.01); *B25J 13/08* (2013.01); *B25J 19/06* (2013.01)

(58) Field of Classification Search
CPC .......... B25J 13/085; B25J 19/06; G01L 3/108
See application file for complete search history.

(56) References Cited

U.S. PATENT DOCUMENTS

| | | |
|---|---|---|
| 4,166,543 A | 9/1979 | Dahlstrom |
| 4,398,110 A | 8/1983 | Flinchbaugh et al. |

(Continued)

FOREIGN PATENT DOCUMENTS

| | | |
|---|---|---|
| CN | 101909830 A | 12/2010 |
| CN | 102328312 A | 1/2012 |

(Continued)

OTHER PUBLICATIONS

Extended European Search Report for EP15758889.8, 4 pages (dated Nov. 27, 2017).

(Continued)

*Primary Examiner* — Harry Y Oh
(74) *Attorney, Agent, or Firm* — Choate, Hall & Stewart LLP

(57) ABSTRACT

A safety system for an industrial robot, specifically an industrial robot and a method for implementing a safety system via predefined safety functions. To perform such safety functions the robot comprises in a joint connecting two robot arm sections a first position sensor (132) for sensing the angular orientation on an input side of a gear in the joint, and a second position sensor (133) for sensing an angular orientation on an output side of the gear.

45 Claims, 1 Drawing Sheet

(51) Int. Cl.
  *B25J 9/16* (2006.01)
  *B25J 19/06* (2006.01)
  *G05B 19/08* (2006.01)

(56) References Cited

U.S. PATENT DOCUMENTS

| | | | |
|---|---|---|---|
| 4,676,002 A | 6/1987 | Slocum | |
| 4,678,952 A | 7/1987 | Peterson et al. | |
| 4,744,039 A | 5/1988 | Suzuki et al. | |
| 4,753,569 A | 6/1988 | Pryor | |
| 4,817,017 A | 3/1989 | Kato | |
| 5,103,941 A | 4/1992 | Vranish | |
| 5,155,423 A | 10/1992 | Karlen et al. | |
| 5,220,261 A | 6/1993 | Kempas | |
| 5,293,107 A | 3/1994 | Akeel | |
| 5,305,220 A * | 4/1994 | Schoggl | G01P 3/489 123/406.63 |
| 5,341,289 A | 8/1994 | Lee | |
| 5,353,386 A | 10/1994 | Kasagami et al. | |
| 5,495,410 A | 2/1996 | Graf | |
| 5,529,159 A * | 6/1996 | Troccaz | B25J 19/0004 192/21 |
| 5,880,956 A | 3/1999 | Graf | |
| 6,040,109 A | 3/2000 | Coppens et al. | |
| 6,041,274 A | 3/2000 | Onishi et al. | |
| 6,070,109 A | 5/2000 | McGee et al. | |
| 6,131,296 A | 10/2000 | Fager | |
| 6,292,715 B1 | 9/2001 | Rongo | |
| 6,408,224 B1 | 6/2002 | Okamoto et al. | |
| 6,519,860 B1 | 2/2003 | Bieg et al. | |
| 6,535,794 B1 | 3/2003 | Raab | |
| 6,704,619 B1 | 3/2004 | Coleman et al. | |
| 6,822,412 B1 | 11/2004 | Gan et al. | |
| 6,837,892 B2 | 1/2005 | Shoham | |
| 6,847,922 B1 | 1/2005 | Wampler, II | |
| 6,856,863 B1 | 2/2005 | Sundar | |
| 6,922,610 B2 | 7/2005 | Okamoto et al. | |
| 6,996,456 B2 | 2/2006 | Cordell et al. | |
| 7,248,012 B2 | 7/2007 | Takahashi et al. | |
| 7,272,524 B2 | 9/2007 | Brogardh | |
| 7,278,222 B2 | 10/2007 | Maier et al. | |
| 7,298,385 B2 | 11/2007 | Kazi et al. | |
| 7,300,240 B2 | 11/2007 | Brogardh | |
| 7,571,025 B2 | 8/2009 | Bischoff | |
| 7,643,907 B2 | 1/2010 | Fuhlbrigge et al. | |
| 7,756,608 B2 | 7/2010 | Brogardh | |
| 8,002,716 B2 | 8/2011 | Jacobsen et al. | |
| 8,050,797 B2 | 11/2011 | Lapham | |
| 8,160,205 B2 | 4/2012 | Saracen et al. | |
| 8,255,462 B2 | 8/2012 | Kondo | |
| 8,301,421 B2 | 10/2012 | Bacon et al. | |
| 8,340,820 B2 | 12/2012 | Nair | |
| 8,410,732 B2 | 4/2013 | Kassow et al. | |
| 8,457,786 B2 | 6/2013 | Andersson | |
| 8,482,242 B2 * | 7/2013 | Nakasugi | B25J 9/1633 318/432 |
| 8,571,706 B2 | 10/2013 | Zhang et al. | |
| 8,571,711 B2 | 10/2013 | Jacobsen et al. | |
| 8,614,559 B2 | 12/2013 | Kassow et al. | |
| 8,649,906 B2 * | 2/2014 | Bischoff | B25J 13/085 700/258 |
| 8,700,197 B2 | 4/2014 | Plociennik et al. | |
| 8,756,973 B2 | 6/2014 | Wallace et al. | |
| 8,774,965 B2 | 7/2014 | Weiss et al. | |
| 8,779,715 B2 | 7/2014 | Kassow et al. | |
| 8,812,155 B2 | 8/2014 | Brethe | |
| 9,248,573 B2 | 2/2016 | Soe-Knudsen et al. | |
| 9,266,240 B2 | 2/2016 | Shiraki et al. | |
| 9,833,897 B2 | 12/2017 | Soe-Knudsen et al. | |
| 2002/0013675 A1 | 1/2002 | Knoll et al. | |
| 2003/0120391 A1 | 6/2003 | Saito | |
| 2004/0018631 A1 | 1/2004 | Ward et al. | |
| 2004/0078114 A1 | 4/2004 | Cordell et al. | |
| 2004/0172164 A1 | 9/2004 | Habibi et al. | |
| 2004/0189631 A1 | 9/2004 | Kazi et al. | |
| 2004/0212626 A1 | 10/2004 | Lyxzen et al. | |
| 2005/0080515 A1 | 4/2005 | Watanabe et al. | |
| 2005/0267637 A1 | 12/2005 | Lapham | |
| 2005/0273198 A1 | 12/2005 | Bischoff | |
| 2006/0069466 A1 | 3/2006 | Kato et al. | |
| 2006/0125806 A1 | 6/2006 | Voyles et al. | |
| 2006/0163939 A1 | 7/2006 | Kuramochi et al. | |
| 2006/0178775 A1 | 8/2006 | Zhang et al. | |
| 2008/0004632 A1 | 1/2008 | Sutherland et al. | |
| 2008/0140258 A1 | 6/2008 | Ueno et al. | |
| 2008/0150467 A1 * | 6/2008 | Hashimoto | B25J 9/1676 318/568.17 |
| 2008/0188983 A1 | 8/2008 | Ban et al. | |
| 2008/0188986 A1 | 8/2008 | Hoppe | |
| 2008/0319557 A1 | 12/2008 | Summers et al. | |
| 2009/0076655 A1 | 3/2009 | Blondel et al. | |
| 2009/0157226 A1 | 6/2009 | de Smet | |
| 2009/0259337 A1 | 10/2009 | Harrold et al. | |
| 2009/0289591 A1 | 11/2009 | Kassow et al. | |
| 2010/0241270 A1 | 9/2010 | Eliuk et al. | |
| 2010/0324733 A1 | 12/2010 | Bischoff et al. | |
| 2011/0022216 A1 | 1/2011 | Andersson | |
| 2012/0010748 A1 | 1/2012 | Sasai | |
| 2012/0089254 A1 | 4/2012 | Shafer et al. | |
| 2012/0210817 A1 | 8/2012 | Kassow et al. | |
| 2012/0286629 A1 * | 11/2012 | Johnson | B25J 9/08 310/68 B |
| 2013/0079928 A1 | 3/2013 | Soe-Knudsen et al. | |
| 2013/0090761 A1 * | 4/2013 | Sejimo | B25J 13/085 700/245 |
| 2013/0231778 A1 | 9/2013 | Ostergaard | |
| 2013/0238122 A1 * | 9/2013 | Hodgins | B25J 9/00 700/245 |
| 2013/0255426 A1 | 10/2013 | Kassow et al. | |
| 2014/0046340 A1 | 2/2014 | Wilson et al. | |
| 2014/0207279 A1 * | 7/2014 | Miyauchi | B25J 13/084 700/253 |
| 2017/0057095 A1 | 3/2017 | Oestergaard et al. | |

FOREIGN PATENT DOCUMENTS

| | | |
|---|---|---|
| CN | 103250109 A | 8/2013 |
| DE | 2735632 C2 | 9/1983 |
| DE | 19858154 A1 | 6/2000 |
| DE | 10048096 A1 | 4/2002 |
| DE | 10157174 A1 | 6/2003 |
| DE | 10239694 A1 | 3/2004 |
| DE | 102006061752 A1 | 7/2008 |
| DE | 102008027008 A1 | 12/2009 |
| EP | 1505464 A2 | 2/2005 |
| EP | 1696289 A1 | 8/2006 |
| EP | 1724676 A1 | 11/2006 |
| EP | 2258521 A1 | 12/2010 |
| EP | 2361736 A2 | 8/2011 |
| EP | 2453325 A1 | 5/2012 |
| EP | 2641136 A1 | 9/2013 |
| EP | 2853359 A1 | 4/2015 |
| EP | 3015932 A1 | 5/2016 |
| ES | 2548037 T3 | 10/2015 |
| JP | S64-50909 A | 2/1989 |
| JP | H01-146645 A | 6/1989 |
| JP | H02-250782 A | 10/1990 |
| JP | H06-190753 A | 7/1994 |
| JP | H10-254527 A | 9/1998 |
| JP | 2001-050741 A | 2/2001 |
| JP | 2002-120174 A | 4/2002 |
| JP | 2004-49731 A | 2/2004 |
| JP | 2004-148466 A | 5/2004 |
| JP | 2004316722 A | 11/2004 |
| JP | 2005-148789 A | 6/2005 |
| JP | 2005-342885 A | 12/2005 |
| JP | 2011-176913 A | 9/2011 |
| JP | 2012-20343 A | 2/2012 |
| JP | WO 2013175553 * | 11/2013 |
| MX | 2013005425 A | 8/2013 |
| RU | 2479414 | 4/2013 |
| RU | 2013125348 A | 12/2014 |
| WO | WO-97/00454 A1 | 1/1997 |

(56) References Cited

FOREIGN PATENT DOCUMENTS

| WO | WO-2004/071717 A1 | 8/2004 |
| WO | WO-2007/099511 A2 | 9/2007 |
| WO | WO-2009/107358 A1 | 9/2009 |
| WO | WO-2012/066025 A1 | 5/2012 |
| WO | WO-2013/175553 A1 | 11/2013 |
| WO | WO-2015/131904 A1 | 9/2015 |

OTHER PUBLICATIONS

First Office Action for CN201580011890.9 (Chinese translation), 9 pages (dated Mar. 12, 2018).
International Preliminary Report on Patentability for PCT/DK2015/050038, 11 pages (dated Sep. 6, 2016).
International Search Report for PCT/DK2015/050038, 4 pages (dated Jun. 12, 2015).
Bennett, D. and Hollerbach, J., Autonomous Calibration of Single-Loop Closed Kinematic Chains Formed by Manipulators with Passive Endpoint Constraints, IEEE Transactions of Robotics and Automation, 7(5):597-606 (1991).
Communication pursuant to Article 94(3) EPC for EP15176362, 4 pages (dated Jan. 5, 2017).
Espacenet, Patent Search, Family List: EP2641136, 2 pages (retrieved Jun. 5, 2017).
File History for CN201180054670, 70 pages (retrieved Jun. 5, 2017).
File History for EP2453325 48 pages (retrieved Jun. 5, 2017).
File History for EP2641136, 1116 pages, counterpart to U.S. Appl. No. 13/885,233 (retrieved Jun. 5, 2017).
File History for EP3015932, 93 pages (retrieved Jun. 5, 2017).
Final Office Action for U.S. Appl. No. 13/885,233, 32 pages (dated Jan. 10, 2017).
Final Office Action for U.S. Appl. No. 13/885,233, 46 pages (dated Jun. 23, 2017).
Flange, Merriam-Webster definition, 11 pages (retrieved Jun. 7, 2017). URL: http://www.merriamwebster.com/dictionary/flange.
International Preliminary Report on Patentability for PCT/EP2011/070228, 26 pages (dated Feb. 27, 2013).
International Search Report for PCT/EP2011/070228, 3 pages (dated Apr. 24, 2012).
KUKA System Software (KSS), KR C2 / KR C3, Expert Programming, Release 5.2, Version 00, 183 pages (Issued Sep. 26, 2003).
Maier, C., Aufbau and Einsatz von Industrierobotern, Design and Use of Industrial Robots, Lecture Notes, 3rd Edition, Institute for Production Technology, 11 pages (1996). [English translation unavailable].
Non-Final Office Action for U.S. Appl. No. 13/885,233, 18 pages (dated Jun. 16, 2016).
Non-Final Office Action for U.S. Appl. No. 13/885,233, 29 pages (dated Apr. 11, 2017).
Opposition against European Patent EP 2641136 B1, 27 pages (Jul. 22, 2015).
Robot, Dictionary.com definition, 5 pages (retrieved Jun. 7, 2017). URL: http://www.dictionary.com/browse/robot?s=t,%2520pages%25201-5).
Summons to attend oral proceedings pursuant to Rule 115(1) EPC for EP11784999, 8 pages (Dec. 1, 2016).
Written Opinion of the International Preliminary Examining Authority for PCT/EP2011/070228, 3 pages (dated Oct. 17, 2012).
Written Opinion of the International Searching Authority for PCT/EP2011/070228, 7 pages (dated Apr. 25, 2012).
Chinese Office Action (Chinese version) for CN201580011890.9, 8 pages (dated Dec. 17, 2018).
Russian Office Action (English translation) for RU2016137881, 4 pages (dated Nov. 26, 2018).
Russian Office Action (Russian version) for RU2016137881, 4 pages (dated Nov. 26, 2018).
Search Report for RU2016137881 (Russian version), 2 pages (dated Nov. 2, 2018).
Communication pursuant to Article 94(3) EPC for EP151763623.0, 5 pages (dated Aug. 13, 2018).
Japanese Office Action (Japanese translation) for JP2016-572887, 12 pages (dated May 8, 2019).
Summary of Notice of Reasons for Rejection for Japanese office action pages (dated May 8, 2019).
Machine Translation of JP-2012-20343-A (publication of Japanese original Feb. 2, 2012).
Third Office Action (English and Chinese translations) for CN201580011890.9, 8 pages (dated Apr. 28, 2019).

* cited by examiner

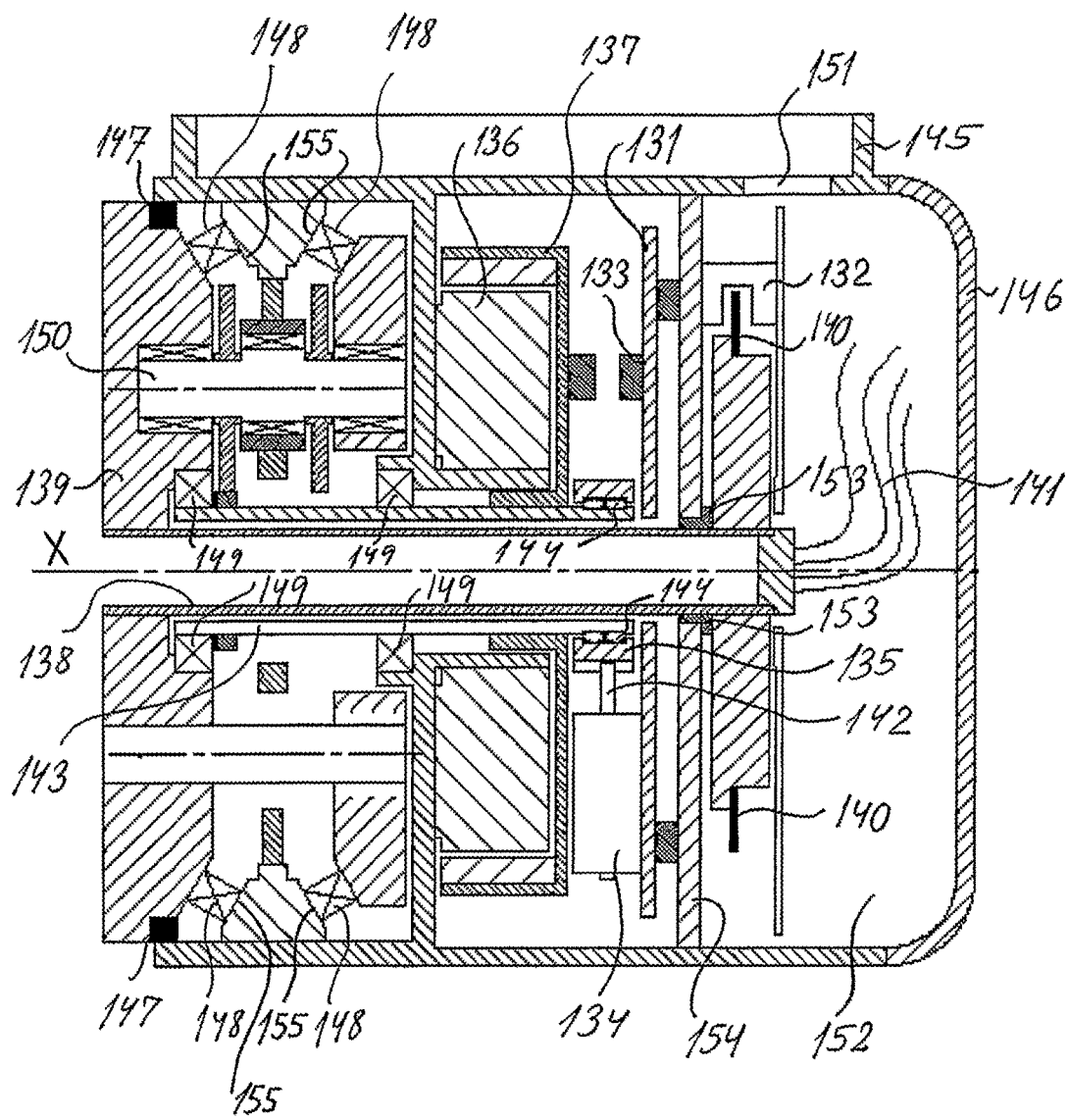

SAFETY SYSTEM FOR INDUSTRIAL ROBOT

CROSS-REFERENCE TO RELATED APPLICATIONS

Priority is hereby claimed to International Application No. PCT/DK2015/050038 which was filed on Feb. 26, 2015, and to Denmark Application No. PA 2014 70103 which was filed on Mar. 4, 2014. The contents of International Application No. PCT/DK2015/050038 and Denmark Application No. PA 2014 70103 are incorporated herein by reference.

FIELD OF THE INVENTION

The present invention relates to robotic safety systems. More specifically the present invention is directed to an industrial robot implementing a safety system via predefined safety functions.

BACKGROUND OF THE INVENTION

Robots are extensively used in the industry for applications such as electronic circuit board assembly and other automated assembly tasks. The particularly high popularity of modern robots is attributed to their simple construction, low cost, low maintenance, light weight, high accuracy, high speed and compliance characteristics.

Generally, the programming of robots used in industry requires specialized knowledge and can only be performed by persons skilled in the art, often referred to as system integrators. In connection with multi-purpose robots for use in industry or even at home some important safety issues still remain unsolved.

A conventional robot system is provided with a collision detection function which detects collision of a robot with its surroundings based on abnormal torque generated at the manipulator part of the robot. If collision is detected by this collision detection function, control is performed to stop the operation of the robot or otherwise lighten the collision force. Due to this, the damage to the robot and the devices provided at the robot as well as surrounding equipment is kept to a minimum.

However, when using a collision detection function for detecting collision between a human and a robot, it is necessary to raise the sensitivity to collision in order to ensure safety of the human. For this reason, it is sought to precisely estimate the frictional torque of the gears or speed reducers etc. provided at the different parts of a robot. In this regard, the frictional torque fluctuates depending on the outside air temperature and the operating state of the robot, so estimating the frictional torque with a high precision is difficult. Therefore, it was difficult to precisely detect collision between a human and a robot from the torques of the manipulator part of a robot and prevent harm to the human.

However, when a human directly contacts a robot without a carried object interposed between them, the force which occurs between the human and the robot is not detected. Further, even if attaching a force sensor for detecting force between the arm and hand of a robot etc., it is not possible to detect contact of the human at the arm portion of the robot which the sensor cannot detect. For this reason, in the prior art, it was not possible to provide a robot system which enabled safe interactive work when there was a possibility of a human and a robot coming into direct contact.

Capacitive sensors have been used to measure capacitance changes, which are caused in the electric field of the capacitor formed by the sensor as a result of the approach of an object. In addition to all electrically good conducting materials, capacitive sensors only detect those materials having an adequately high permittivity. Capacitive sensors are not useful as a safety device in the case of rapidly moving apparatuses with solid parts moved freely in space. In this connection a complete system is desirable, which permits a reliable human-machine cooperation.

A robot is a physical machine which can potentially be dangerous and cause harm to humans by colliding with them. In case of hardware or software defects, the robot might even do unexpected motions, which were not anticipated by the system integrator (the person responsible for the safety when setting up the robot). For this reason, it can be very desirable for a robot to have an improved safety system.

US2010/0324733 discloses a robot with a safety system comprising a joint, a first torque sensor and a second torque sensor mounted at each joint. Torque sensors (such as straing gagues) are not applicable for obtaining a reliable safety control system. Moreover, the sensors in US2010/0324733 are connected to two computing units S1, S2 in the form of integrated circuits (ICs), which have microcontrollers, within a transmitter unit S. Thus, US2010/0324733 does not have all sensor circuits placed on the same component, which renders it less applicable for safety control.

The problem of the invention is to provide a safety device for the operation of apparatuses with parts freely movable in space, which permits the reliable and safe operation of such apparatuses without complicated and costly peripherals and which also ensures that collisions between apparatus parts and humans or objects are detected reliably at an early stage, so that in addition to avoiding planning and production costs there is a considerably reduced space requirement for such installations, so that in future people and machines can jointly use working areas.

SUMMARY OF THE INVENTION

The above and other objects are according to the present invention attained by a programmable robot system having a special safety control system.

It is specifically an object of the present invention to provide a programmable robot system which can be programmed in a simple and easy manner without this requiring specialized knowledge, i.e. which can be performed for instance by an operator or technician in industry or even by a private person for instance at home. Specifically the safety control system utilizes two position sensors in each robot joint to achieve desired safety functions as will be explained in more detail below. The position sensors are used for sensing the angular or linear position on the input or output side of the gear or similar transmission device. If any violations of operational limits or errors in hardware or software is discovered by any of the safety functions, the robot will be brought to a safe state.

In accordance with the present invention the system is designed so that no single failure in either software or hardware can cause the robot to become dangerous. A common way of realizing this is to have two separate systems (branches) for performing the safety functions. Both of these systems can independently shut off power to the robot. Each of these systems can monitor the desired safety parameters.

The present inventors have found that placing position sensors on both sides of the gear certain safety issues relating to industrial robots can be solved in a simple manner. In the robot joint the sensors are placed so that one position sensor sits on the input side of the gear (motor side) and one sits on the output side of the gear (robot arm side). Importantly, the control unit processes information from the two sensors to realize one or more safety functions by having all sensor circuits placed on the same component (in contrast to US2010/0324733 that uses separate components for the sensor circuits). The safety system executes a multitude of safety functions, based on the two sensors. Each safety function compares its used values with second branch, and in case of disagreement, brings the robot to the safe state. In order to prevent failures due to safety violations, most of the safety functions also limit the parameters. They can for instance limit the velocity of the robot arm movement in order to avoid momentum violation. The safety functions are herein defined as:

Joint Position Limit Safety Function:

In the first system, the output side position sensor directly monitors the angle of the robot joint, and detects if it goes outside the limit defined by the safety settings. In the second system, the input side position sensor calculates the corresponding output side position, by taking the number of full revolutions and the gear ratio into account.

Joint Speed Limit Safety Function:

The speed of the robot joint can be approximated by the difference in position over a time interval (numerical differentiation). In case of high resolution position sensors and a good time measurement, this can be fairly accurate. Hereby a speed safety function in each of the two safety system branches is realized.

Joint Torque Limit Safety Function:

By knowing the position and speed of each robot joint, and the distribution of mass in the robot arm, the expected torque exerted in each robot joint can be calculated (output side). The motor currents are also measured to estimate the motor side torque on the joint (input side). These two systems can be used to verify that the torque is within a given limit.

Tool Position Limit Safety Function:

Where the two sensors are used in combination with software models of the robots kinematics to deduce the position of the robot arm end effector, and make sure that this position is within some user-defined limits.

Tool Orientation Limit Safety Function:

Where the two sensors are used in combination with software models of the robots kinematics to deduce the orientation of the robot arm end effector, and make sure that this orientation is within some specified angular limits.

Tool Speed Limit Safety Function:

Numerical differentiation of the position can be used to estimate the speed of the Tool, similar to the "Joint Speed Limit Safety Function" and "Tool Pose Limit Safety Function".

Tool Force Limit Safety Function:

The expected torque mentioned in the "Joint Torque Limit Safety Function" can be projected into Cartesian space, to realize a force limiting function.

Momentum Limit Safety Function:

The position and speed of the robot joints can be used to calculate and limit the momentum of the robot and the payload at any given point in time, using a model of the distribution of mass in the robot arm and the payload.

Emergency Stop Safety Function:

When emergency stop is pressed, the redundant speed measurement is used to check that the robot is actually decelerating, whereby the robot decelerates actively and within the programs trajectory, in a fail safe way.

Safeguard Stop Safety Function:

The speed estimation can also be used to control and ensure a redundant deceleration of the robot when a safeguard input is active.

Power Limit Safety Function:

By reducing the torque produced by the joints, based on the speeds of the joints, is used for making sure that the total mechanical work produced by the robot is kept within a certain limit.

Robot Moving Digital Output Safety Function:

The two sensors can each detect whether the robot joints are moving, and set the output accordingly.

Robot Not Stopping Digital Output Safety Function:

The two sensors can in combination with the current consumption in the joints each detect if the robot is not actively braking or stopped, and set an output accordingly.

Reduced Mode Zone Safety Function:

The two sensors can be used to monitor where the robot is in its workspace, and change the safety parameters accordingly. E.g. the robot moves faster inside the CNC machine than outside, because the risk of hitting a person is much smaller inside the CNC machine.

The Tool-based safety function consider a point on the Tool, such as the TCP (Tool Centre Point) or a point on a flange on the robot.

Accordingly, the present invention provides in a first aspect an industrial robot having a safety system comprising:
  a joint connecting two robot arm sections of a robot arm and equipped with a gear or similar transmission device for transmission of force or torque from one arm section to the other;
  a first position sensor for sensing the position on the input side of the transmission;
  a second position sensor for sensing the position on the output side of the transmission;
  control unit for implementing a software model of the physical robot arm, including kinematics and dynamics calculations;
  user interface means comprising means for programming the robot, said user interface means being either provided externally to the robot, as an integral part of the robot or as a combination hereof;
  storage means co-operating with said user interface means and said control unit for storing information related to the movement and further operations of the robot; wherein the control unit processes information from the two position sensors to realize one or more safety functions, such as 1, 2, 3, 4, 5, 6, 7, 8, 9, 10, 11, 12, 13, 14, 15, 16, 17, 18, or 19 of the following safety functions:
  Joint Position Limit Safety Function, wherein the second position sensor directly monitors the angle of the robot joint, and detects if the angle is beyond a predefined angle range, whereas the first position sensor calculates the corresponding output side position based on the number of full revolutions and gear ratio;
  Joint Speed Limit Safety Function, wherein the speed of the robot joint is determined by the difference in position over a time interval;
  Joint Torque Limit Safety Function, wherein the position and speed of the robot joint in conjunction with the distribution of mass in the robot arm is used to calculate the expected torque exerted in the robot joint;
  Tool Speed Limit Safety Function, wherein numerical differentiation of the position is used to estimate the speed of the Tool;

Tool Force Limit Safety Function, wherein expected torque calculated in said Joint Torque Limit Safety Function is projected into Cartesian space, to obtain a force limiting function;

Momentum Limit Safety Function, wherein the position and speed of the robot joints can be used to calculate and limit the momentum of the robot and the payload at any given point in time, using a model of the distribution of mass in the robot arm and the payload;

Emergency Stop Safety Function, wherein emergency stop is activated, the redundant speed measurement is used to check that the robot is actually decelerating, whereby the robot decelerates actively and within the programs trajectory, in a fail safe way;

Safeguard Stop Safety Function, wherein the dual-sensor based speed estimation is used to control a redundant deceleration of the robot when a safeguard input is active;

Power Limit Safety Function, wherein the position and speed of the robot joints, combined with kinematics and dynamics models of the arm constantly monitor whether the total mechanical work produced by the robot arm is kept within a certain limit;

Robot Moving Digital Output Safety Function, wherein the two sensors each detect whether the robot joints are moving, and set an output accordingly;

Robot Not Stopping Digital Output Safety Function, wherein the two sensors each detect if the robot is not actively braking or stopped and set an output accordingly;

Reduced Mode Zone Safety Function, wherein the two sensors are used to monitor, whether the robot is in its workspace, and change the safety parameters accordingly;

Tool Position Limit Safety Function, wherein the two sensors are used in combination with software models of the robots kinematics to calculate the position of the robot arm end effector, and make sure that this position is within some user-defined limits; and Tool Orientation Limit Safety Function, wherein the two sensors are used in combination with software models of the robots kinematics to calculate the orientation of the robot arm end effector, and make sure that this orientation is within some specified angular limits.

In a preferred embodiment of the present invention the sensors sense angular or linear position. Preferably the first position sensor senses the position on the input side of the gear, whereas the second position sensor senses the position on the output side of the gear.

In a preferred embodiment of the present invention the control unit uses information from the two sensors to realize at least the following safety functions:

Joint Position Limit Safety Function;
Joint Speed Limit Safety Function; and
Joint Torque Limit Safety Function.

In another aspect of the present invention there is provided a method for safety control of an industrial robot, which method performs the above recited safety functions.

BRIEF DESCRIPTION OF THE DRAWING

FIG. 1 shows a cross sectional view through a robot joint according to an embodiment of the invention.

DETAILED DESCRIPTION OF THE INVENTION

In accordance with the present invention the system is designed so that no single failure in either software or hardware can cause the robot to become dangerous.

A common way of realizing this is to have two separate systems for performing the safety functions. Both of these systems can independently shut off power to the robot. Each of these systems can monitor the desired safety parameters. The two systems should be as diverse as possible to avoid common cause failures. These failures could be compiler errors, methodology errors, software bugs, electronics glitches. To overcome this, the two branches of the safety system software is made by two independent teams of programmers, the source code is compiled by different compilers, and run on different microprocessors. The two branches use different hardware to measure the angular positions, and two different ways of cutting off the power supply in case of a failure.

Since the safety control system utilizes two sensors in each robot joint to achieve desired safety functions defined above a more detailed description of such a modified robot joint is provided below.

With reference to FIG. 1 there is shown a cross sectional view through a joint according to an embodiment of the invention. The joint comprises mechanical, electro-mechanical, electronic and optical elements that are mutually interconnected, either directly via electrical connectors or via wireless, for instance optical, coupling to other elements. In order to ensure the most simple and straightforward mounting and connection of these elements it is advantageous if as many as possible of these elements are provided on one printed circuit board 131 (PCB). A cross sectional view through an embodiment of a joint, which can be used in six-axis robots, but it is understood that this joint could also be used in connection with other robots.

In the shown embodiment position sensors 132, 133 are used and a safety brake 134, 135 is implemented. The brake is designed such that the solenoid 134 can activate and deactivate the brake with a very limited force.

The sensor 133 used for determining the position (angular orientation of the axle/rotor) of the motor (angular orientation) is mounted at the rear surface of the PCB 131. The motor shown in FIG. 1 comprises a stator part 136 and a rotor part 137.

The sensor 132 used for determining the angular orientation of the output axle 138 or output flange 139 of the joint is mounted on the front surface of the PCB or in a socket on the front surface of the PCB 131. Preferably a high resolution sensor is used and the short distance between the hollow axle 138 and the sensor is important in order to attain a proper positioning of sensor and encoder disc relative to each other. In order to be able to sense the movement (rotation) of the output flange 139 at the PCB 131 through the joint the encoder disc 140 is mounted on the hollow axle 138 through which electrical and pneumatical connections 141 are guided through the joint and the hollow axle 138 is connected to the output flange 139.

The safety brake 134 and 135, which stops the robot 137 for instance at power drop-out, is formed as an integral part with the PCB 131. The solenoid 134, which in the event of power drop-out displaces a ratchet 142 into engagement with an annular member 135 mounted on the motor axle 143, is mounted directly on the PCB 131. This annular member 135 (friction ring) can rotate relative to the motor axle, but there is a high friction between the annular member and the motor axle 143. This ensures a controlled halt of the joint but without halting the joint so abruptly that the robot arm becomes overloaded. In the figure, friction between the annular member 135 and the motor axle 143 is ensured by O-rings 144 tightly fitted between the motor axle 143 and the annular member 135 (friction ring).

Furthermore, the joint according to this embodiment of the invention is designed such that adjacent joints can be attached to each other without use of further elements. Attachment of the joint to an adjacent joint or connecting member (for instance a thin-walled tube) takes place via the output flange 139 and the connecting portion 145 on the housing 146 of the joint. Apart from this, robot joints according to the invention can be coupled together by suitable members, for instance thin-walled tubes, which constitutes a preferred choice due to their optimal rigidity/weight ratio. Furthermore, the joint according to this embodiment of the invention comprises a seal 147 between the housing 146 and the output flange 139, main bearings 148 resting against inclined inner surface portions (bearing surfaces) 155 provided in the housing 146, sealed bearings 149, transmission 150, at least one passage 151 for connections from an adjacent joint or connecting member, an area/space (152) for a slip ring and for twisting wires 141, when the output members 138, 139 rotate, further bearings 153 and a plate 154, for instance of aluminium or other suitable material, for mounting the PCB 131 and also for acting as a heat sink for power electronics in the joint.

Instead of a pair of thrust angular-contact needle bearings shown in the figure as the main bearing arrangement in the joint, a single four point of contact ball bearing or a single crossed roller bearing or a pair of angular contact ball bearings could be used.

Furthermore, instead of the shown eccentric gear arrangement with a single eccentric pinion, an eccentric gear arrangement with 2 pinions, phaseshifted 180 degrees, or 3 pinions, phase shifted 120 degrees could be used. Alternatively, a harmonic drive gear can be used in the unit, either with or without an integrated output bearing.

Although a number of specific embodiments have been shown and described above, it is understood that the present invention, both the robot itself, the user interface means used for programming and controlling the robot and the entire control system as such may be implemented in a number of different ways. Thus, for instance numerous alternative menu pages on the user interface may be designed. The scope of the invention is thus defined by the appended claims including technical equivalents of these. It is furthermore understood that the user interface means of the invention may also be used in connection with other robots than those shown, described and claimed in the present application and that this also applies to the electro-mechanical elements of the robot, such as the joints with drive means, encoders, etc.

The invention claimed is:

1. An industrial robot comprising:
a robot arm having multiple sections;
a joint connecting two sections of the robot arm, the joint comprising a gear or transmission device for transmitting force or torque from one section of the robot arm to another section of the robot arm;
a first position sensor for sensing a first position on an input side of the gear or transmission device;
a second position sensor for sensing a second position on an output side of the gear or transmission device;
a control system configured to perform, using two separate systems, a same safety function among one or more safety functions for the industrial robot based on at least one of the first position or the second position and, in a case that outputs of the same safety function performed by the two separate systems disagree, to put the industrial robot in a safe state; and
a user interface for programming the industrial robot, the user interface being external to the industrial robot, an integral part of the industrial robot, or a combination of external to the industrial robot and the integral part of the industrial robot.

2. The industrial robot of claim 1, wherein the one or more safety functions comprise two or more of the following:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint;
a joint torque limit safety function in which a position and a speed of the joint and distribution of mass in the robot arm and a model of friction are used to calculate expected torque exerted in the joint;
a tool speed limit safety function in which a speed of a tool is determined based on output from the first position sensor and the second position sensor;
a tool force limit safety function in which the expected torque is projected into Cartesian space to obtain a force limiting function;
a power limit safety function in which mechanical work, calculated as torque times speed for the joint, is limited to a certain value;
an emergency stop safety function in which, when emergency stop is activated, redundant speed measurement is used to check that the industrial robot is decelerating, the industrial robot being configured to decelerate actively and within a trajectory in a fail-safe way;
a safeguard stop safety function in which speed estimation is used to control a deceleration of the robot when a safeguard input is active;
a power limit safety function in which a position and speed of the joint and a software model representing kinematics and dynamics of the robot arm are used in constantly monitoring whether total power put into the robot arm is within a certain limit;
a robot moving digital output safety function in which the first position sensor and the second position sensor each are configured to detect whether one or more robot joints are moving, and to set an output based on whether the one or more robot joints are moving;
a robot not stopping digital output safety function in which the first position sensor and the second position sensor each are configured to detect if the industrial robot is not actively braking or stopped;
a reduced mode zone safety function in which the first position sensor and the second position sensor are configured to monitor whether the industrial robot is in a workspace, and to change safety parameters based on whether the industrial robot is in the workspace;
a tool position limit safety function in which the first position sensor and the second position sensor are used in combination with the software model to determine a position of a robot arm end effector and to ensure that the position is within a user-defined limit;
a tool orientation limit safety function in which the first position sensor and the second position sensor are used in combination with the software model to determine orientation of the robot arm end effector and to ensure that the orientation is within a specified angular limit; or a momentum limit safety function in which a position and a speed of one or more robot joints are usable to determine and to limit momentum of the industrial robot and a payload based on a distribution of mass in the robot arm and the payload.

3. The industrial robot of claim 1, wherein the robot arm is configured to hold a robot tool.

4. The industrial robot of claim 1, wherein the first position sensor comprises an encoder for sensing angular or linear position.

5. The industrial robot of claim 1, wherein the second position sensor comprises an encoder for sensing angular or linear position.

6. The industrial robot of claim 1, wherein the first position sensor is for sensing only the first position on the input side.

7. The industrial robot of claim 1, wherein the second position sensor is for sensing only the second position on the output side.

8. The industrial robot of claim 1, wherein the one or more safety functions comprise:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint; and
a joint torque limit safety function in which a position and a speed of the joint and a distribution of mass in the robot arm and a model of friction are used to calculate expected torque exerted in the joint.

9. The industrial robot of claim 1, wherein the one or more safety functions comprise:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint;
a joint torque limit safety function in which a position and a speed of the joint and a distribution of mass in the robot arm and a model of friction are used to calculate expected torque exerted in the joint;
a tool speed limit safety function in which a speed of a tool is determined based on output from the first position sensor and the second position sensor; and
a tool force limit safety function in which the expected torque is projected into Cartesian space to obtain a force limiting function.

10. A method for providing safety control of an industrial robot, wherein the industrial robot comprises:
a joint connecting two sections of a robot arm and comprising a gear or transmission device for transmitting force or torque from one section to another section of the robot arm; a first position sensor for sensing a first position on an input side of the gear or transmission device; a second position sensor for sensing a second position on an output side of the gear or transmission device; a control system for performing, using two separate systems a same safety function among one or more safety functions for the industrial robot based on at least one of the first position or the second position; and a user interface for programming the industrial robot, the user interface being external to the industrial robot, an integral part of the industrial robot, or a combination of external to the industrial robot and the integral part of the industrial robot; and
wherein the method comprises:
performing, using the two separate systems, the same safety function for the industrial robot based on at least one of the first position or the second position;
comparing outputs of the at least one safety function from the two separate systems that performed the same safety function; and
in a case that the outputs from the two separate systems that perform the same safety function disagree, putting the industrial robot in a safe state.

11. The method of claim 10, wherein the robot arm is configured to hold a robot tool.

12. The method of claim 10, wherein the first position sensor senses angular or linear position.

13. The method of claim 10, wherein the second position sensor senses angular or linear position.

14. The method of claim 10, wherein the first position sensor senses position on an input side of the gear.

15. The method of claim 10, wherein the second position sensor senses position on an output side of the gear.

16. The method of claim 10, wherein the one or more safety functions comprise:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint; and
a joint torque limit safety function in which a position and a speed of the joint and a distribution of mass in the robot arm and a model of friction are used to calculate expected torque exerted in the joint.

17. The method of claim 10, wherein the one or more safety functions comprise:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint;
a joint torque limit safety function in which a position and a speed of the joint and a distribution of mass in the robot arm and a model of friction are used to calculate expected torque exerted in the joint;
a tool speed limit safety function in which a speed of a tool is determined based on output from the first position sensor and the second position sensor; and
a tool force limit safety function in which the expected torque is projected into Cartesian space to obtain a force limiting function.

18. The method claim 10, wherein the one or more safety functions comprise one or more of the following:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;

a joint speed limit safety function in which a speed of the joint is determined by a rate of change in position of the joint;

a joint torque limit safety function in which a position and a speed of the joint and a distribution of mass in the robot arm and a model of friction are used to calculate expected torque exerted in the joint;

a tool speed limit safety function in which a speed of a tool is determined based on output from the first position sensor and the second position sensor;

a tool force limit safety function in which the expected torque is projected into Cartesian space to obtain a force limiting function;

a power limit safety function in which mechanical work, calculated as torque times speed for the joint, is limited to a certain value;

an emergency stop safety function in which, when emergency stop is activated, redundant speed measurement is used to check that the industrial robot is decelerating, the industrial robot being configured to decelerate actively and within a trajectory in a fail-safe way;

a safeguard stop safety function in which speed estimation is used to control a deceleration of the robot when a safeguard input is active;

a power limit safety function in which a position and speed of the joint and a software model representing kinematics and dynamics of the robot arm are used in constantly monitoring whether total power put into the robot arm is within a certain limit;

a robot moving digital output safety function in which the first position sensor and the second position sensor each are configured to detect whether one or more robot joints are moving, and to set an output based on whether the one or more robot joints are moving;

a robot not stopping digital output safety function in which the first position sensor and the second position sensor each are configured to detect if the industrial robot is not actively braking or stopped;

a reduced mode zone safety function in which the first position sensor and the second position sensor are configured to monitor whether the industrial robot is in a workspace, and to change safety parameters based on whether the industrial robot is in the workspace;

a tool position limit safety function in which the first position sensor and the second position sensor are used in combination with the software model to determine a position of a robot arm end effector and to ensure that the position is within a user-defined limit;

a tool orientation limit safety function in which the first position sensor and the second position sensor are used in combination with the software model to determine orientation of the robot arm end effector and to ensure that the orientation is within a specified angular limit; or a momentum limit safety function in which a position and a speed of one or more robot joints are usable to determine and to limit momentum of the industrial robot and a payload based on a distribution of mass in the robot arm and the payload.

19. The industrial robot of claim 1, wherein the one or more safety functions comprise a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint.

20. The industrial robot of claim 1, wherein the one or more safety functions comprise a joint speed limit safety function in which a speed of the joint is determined by a rate of change in position of the joint.

21. The industrial robot of claim 1, wherein the one or more safety functions comprise a joint torque limit safety function in which a position and a speed of the joint and a distribution of mass in the robot arm and a model of friction are used to calculate expected torque exerted in the joint.

22. The industrial robot of claim 1, wherein the one or more safety functions comprise a tool speed limit safety function in which a speed of a tool is determined based on output from the first position sensor and the second position sensor.

23. The industrial robot of claim 1, wherein the one or more safety functions comprise a tool force limit safety function in which an expected torque of the joint is projected into Cartesian space to obtain a force limiting function.

24. The industrial robot of claim 1, wherein the one or more safety functions comprise a power limit safety function in which mechanical work, calculated as torque times speed for the joint, is limited to a certain value.

25. The industrial robot of claim 1, wherein the one or more safety functions comprise an emergency stop safety function in which, when emergency stop is activated, redundant speed measurement is used to check that the industrial robot is decelerating, the industrial robot being configured to decelerate actively and within a trajectory in a fail-safe way.

26. The industrial robot of claim 1, wherein the one or more safety functions comprise a safeguard stop safety function in which speed estimation is used to control a deceleration of the robot when a safeguard input is active.

27. The industrial robot of claim 1, wherein the one or more safety functions comprise a power limit safety function in which a position and speed of the joint and a software model representing kinematics and dynamics of the robot arm are used in monitoring whether total power put into the robot arm is within a certain limit.

28. The industrial robot of claim 1, wherein the one or more safety functions comprise a robot moving digital output safety function in which the first position sensor and the second position sensor each are configured to detect whether one or more robot joints are moving, and to set an output based on whether the one or more robot joints are moving.

29. The industrial robot of claim 1, wherein the one or more safety functions comprise a robot not stopping digital output safety function in which the first position sensor and the second position sensor each are configured to detect if the industrial robot is not actively braking or stopped.

30. The industrial robot of claim 1, wherein the one or more safety functions comprise a reduced mode zone safety function in which the first position sensor and the second position sensor are configured to monitor whether the industrial robot is in a workspace, and to change safety parameters based on whether the industrial robot is in the workspace.

31. The industrial robot of claim 1, wherein the one or more safety functions comprise a tool position limit safety function in which the first position sensor and the second position sensor are used in combination with a model based on the robot arm to determine a position of a robot arm end effector and to ensure that the position is within a user-defined limit.

32. The industrial robot of claim 1, wherein the one or more safety functions comprise a tool orientation limit safety function in which the first position sensor and the second position sensor are used in combination with a model based on the robot arm to determine orientation of a robot arm end effector and to ensure that the orientation is within a specified angular limit.

33. The industrial robot of claim 1, wherein the one or more safety functions comprise a momentum limit safety function in which a position and a speed of one or more robot joints are usable to determine and to limit momentum of the industrial robot and a payload based on a distribution of mass in the robot arm and the payload.

34. The industrial robot of claim 1, wherein the two separate systems comprise two branches of safety system software, each branch for performing the same safety function independent of the other branch.

35. The industrial robot of claim 1, wherein the control system comprises microprocessors, each of the microprocessors being configured to perform at least part of the same safety function.

36. The industrial robot of claim 1, wherein the control system comprises microprocessors, a first microprocessor among the microprocessors being configured to perform at least part of a first safety function among the one or more safety functions based on the first position, and a second microprocessor among the microprocessors being configured to perform at least part of a second safety function among the one or more safety functions based on the second position.

37. The method of claim 10, wherein the two separate systems comprise two branches of safety system software, each branch for performing the same safety function independent of the other branch.

38. The method of claim 10, wherein the control system comprises microprocessors, each of the microprocessors being configured to perform at least part of the same safety function.

39. The method of claim 10, wherein the control system comprises microprocessors, a first microprocessor among the microprocessors performing at least part of a first safety function among the one or more safety functions based on the first position, and a second microprocessor among the microprocessors performing at least part of a second safety function among the one or more safety functions based on the second position.

40. An industrial robot comprising:
a robot arm having multiple sections;
a joint connecting two sections of the robot arm, the joint comprising a gear or transmission device for transmitting force or torque from one section of the robot arm to another section of the robot arm;
a first position sensor for sensing a first position on an input side of the gear or transmission device;
a second position sensor for sensing a second position on an output side of the gear or transmission device;
a control system configured to perform, multiple times, at least two safety functions for the industrial robot based on at least one of the first position or the second position and, in a case that outputs of at least one of the safety functions disagree, to put the industrial robot in a safe state; and
a user interface for programming the industrial robot, the user interface being external to the industrial robot, an integral part of the industrial robot, or a combination of external to the industrial robot and the integral part of the industrial robot;

wherein the at least two safety functions comprise two or more of the following:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint;
a joint torque limit safety function in which a position and a speed of the joint and distribution of mass in the robot arm and a model of friction are used to calculate expected torque exerted in the joint;
a tool speed limit safety function in which a speed of a tool is determined based on output from the first position sensor and the second position sensor;
a tool force limit safety function in which the expected torque is projected into Cartesian space to obtain a force limiting function;
a power limit safety function in which mechanical work, calculated as torque times speed for the joint, is limited to a certain value;
an emergency stop safety function in which, when emergency stop is activated, redundant speed measurement is used to check that the industrial robot is decelerating, the industrial robot being configured to decelerate actively and within a trajectory in a fail-safe way;
a safeguard stop safety function in which speed estimation is used to control a deceleration of the robot when a safeguard input is active;
a power limit safety function in which a position and speed of the joint and a software model representing kinematics and dynamics of the robot arm are used in constantly monitoring whether total power put into the robot arm is within a certain limit;
a robot moving digital output safety function in which the first position sensor and the second position sensor each are configured to detect whether one or more robot joints are moving, and to set an output based on whether the one or more robot joints are moving;
a robot not stopping digital output safety function in which the first position sensor and the second position sensor each are configured to detect if the industrial robot is not actively braking or stopped;
a reduced mode zone safety function in which the first position sensor and the second position sensor are configured to monitor whether the industrial robot is in a workspace, and to change safety parameters based on whether the industrial robot is in the workspace;
a tool position limit safety function in which the first position sensor and the second position sensor are used in combination with the software model to determine a position of a robot arm end effector and to ensure that the position is within a user-defined limit;
a tool orientation limit safety function in which the first position sensor and the second position sensor are used in combination with the software model to determine orientation of the robot arm end effector and to ensure that the orientation is within a specified angular limit; or a momentum limit safety function in which a position and a speed of one or more robot joints are usable to determine and to limit momentum of the industrial robot and a payload based on a distribution of mass in the robot arm and the payload.

41. An industrial robot comprising:
a robot arm having multiple sections;
a joint connecting two sections of the robot arm, the joint comprising a gear or transmission device for transmitting force or torque from one section of the robot arm to another section of the robot arm;
a first position sensor for sensing a first position on an input side of the gear or transmission device;
a second position sensor for sensing a second position on an output side of the gear or transmission device;
a control system configured to perform, multiple times, at least two safety functions for the industrial robot based on at least one of the first position or the second position and, in a case that outputs of at least one of the safety functions disagree, to put the industrial robot in a safe state; and
a user interface for programming the industrial robot, the user interface being external to the industrial robot, an integral part of the industrial robot, or a combination of external to the industrial robot and the integral part of the industrial robot;
wherein the at least two safety functions comprise two or more of the following:
 a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
 a joint speed limit safety function in which a speed of the joint is determined by a rate of change in position of the joint; and
 a joint torque limit safety function in which a position and a speed of the joint and a distribution of mass in the robot arm and a model of friction are used to calculate expected torque exerted in the joint.

42. An industrial robot comprising:
a robot arm having multiple sections;
a joint connecting two sections of the robot arm, the joint comprising a gear or transmission device for transmitting force or torque from one section of the robot arm to another section of the robot arm;
a first position sensor for sensing a first position on an input side of the gear or transmission device;
a second position sensor for sensing a second position on output side of the gear or transmission device;
a control system configured to perform, multiple times, at least two safety functions for the industrial robot based on at least one of the first position or the second position and, in a case that outputs of at least one of the safety functions disagree, to put the industrial robot in a safe state; and
a user interface for programming the industrial robot, the user interface being external to the industrial robot, an integral part of the industrial robot, or a combination of external to the industrial robot and the integral part of the industrial robot;
wherein the at least two safety functions comprise two or more of the following:
 a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
 a joint speed limit safety function in which a speed of the joint is determined by a rate of change in position of the joint;
 a joint torque limit safety function in which a position and a speed of the joint and a distribution of mass in the robot arm and a model of friction are used to calculate expected torque exerted in the joint;
 a tool speed limit safety function in which a speed of a tool is determined based on output from the first position sensor and the second position sensor; and
 a tool force limit safety function in which the expected torque is projected into Cartesian space to obtain a force limiting function.

43. A method for providing safety control of an industrial robot, wherein the industrial robot comprises:
a joint connecting two sections of a robot arm and comprising a gear or transmission device for transmitting force or torque from one section to another section of the robot arm; a first position sensor for sensing a first position on an input side of the gear or transmission device; a second position sensor for sensing a second position on an output side of the gear or transmission device; a control system comprising multiple systems, each system for performing, multiple times, at least one safety function among two or more safety functions for the industrial robot based on at least one of the first position or-the second position; and a user interface for programming the industrial robot, the user interface being external to the industrial robot, an integral part of the industrial robot, or a combination of external to the industrial robot and the integral part of the industrial robot; and
wherein the method comprises:
 performing, multiple times, at least two safety functions among the two or more safety functions for the industrial robot based on at least one of the first position or the second position;
 comparing outputs of the at least two safety functions from the multiple times that the at least two safety functions were performed; and
 in a case that the outputs from at least one of the safety functions disagree, putting the industrial robot in a safe state; and
wherein the two or more safety functions comprise:
 a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
 a joint speed limit safety function in which a speed of the joint is determined by a rate of change in position of the joint;
 a joint torque limit safety function in which a position and a speed of the joint and distribution of mass in the robot arm and a model of friction are used to calculate expected torque exerted in the joint;
 a tool speed limit safety function in which a speed of a tool is determined based on output from the first position sensor and the second position sensor;

a tool force limit safety function in which the expected torque is projected into Cartesian space to obtain a force limiting function;

a power limit safety function in which mechanical work, calculated as torque times speed for the joint, is limited to a certain value;

an emergency stop safety function in which, when emergency stop is activated, redundant speed measurement is used to check that the industrial robot is decelerating, the industrial robot being configured to decelerate actively and within a trajectory in a fail-safe way;

a safeguard stop safety function in which speed estimation is used to control a deceleration of the robot when a safeguard input is active;

a power limit safety function in which a position and speed of the joint and a software model representing kinematics and dynamics of the robot arm are used in constantly monitoring whether total power put into the robot arm is within a certain limit;

a robot moving digital output safety function in which the first position sensor and the second position sensor each are configured to detect whether one or more robot joints are moving, and to set an output based on whether the one or more robot joints are moving;

a robot not stopping digital output safety function in which the first position sensor and the second position sensor each are configured to detect if the industrial robot is not actively braking or stopped;

a reduced mode zone safety function in which the first position sensor and the second position sensor are configured to monitor whether the industrial robot is in a workspace, and to change safety parameters based on whether the industrial robot is in the workspace;

a tool position limit safety function in which the first position sensor and the second position sensor are used in combination with the software model to determine a position of a robot arm end effector and to ensure that the position is within a user-defined limit;

a tool orientation limit safety function in which the first position sensor and the second position sensor are used in combination with the software model to determine orientation of the robot arm end effector and to ensure that the orientation is within a specified angular limit; or a momentum limit safety function in which a position and a speed of one or more robot joints are usable to determine and to limit momentum of the industrial robot and a payload based on a distribution of mass in the robot arm and the payload.

44. A method for providing safety control of an industrial robot, wherein the industrial robot comprises:

a joint connecting two sections of a robot arm and comprising a gear or transmission device for transmitting force or torque from one section to another section of the robot arm; a first position sensor for sensing a first position on an input side of the gear or transmission device; a second position sensor for sensing a second position on an output side of the gear or transmission device; a control system comprising multiple systems, each system for performing, multiple times, at least one safety function among two or more safety functions for the industrial robot based on at least one of the first position or-the second position; and a user interface for programming the industrial robot, the user interface being external to the industrial robot, an integral part of the industrial robot, or a combination of external to the industrial robot and the integral part of the industrial robot; and wherein the method comprises:
performing, multiple times, at least two safety functions among the two or more safety functions for the industrial robot based on at least one of the first position or the second position;
comparing outputs of the at least two safety functions from the multiple times that the at least two safety functions were performed; and
in a case that the outputs from at least one of the safety functions disagree, putting the industrial robot in a safe state; and wherein the two or more safety functions comprise:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint; and
a joint torque limit safety function in which a position and a speed of the joint and a distribution of mass in the robot arm and a model of friction are used to calculate expected torque exerted in the joint.

45. A method for providing safety control of an industrial robot, wherein the industrial robot comprises:

a joint connecting two sections of a robot arm and comprising a gear or transmission device for transmitting force or torque from one section to another section of the robot arm; a first position sensor for sensing a first position on an input side of the gear or transmission device; a second position sensor for sensing a second position on an output side of the gear or transmission device; a control system comprising multiple systems, each system for performing, multiple times, at least one safety function among two or more safety functions for the industrial robot based on at least one of the first position or-the second position; and a user interface for programming the industrial robot, the user interface being external to the industrial robot, an integral part of the industrial robot, or a combination of external to the industrial robot and the integral part of the industrial robot; and wherein the method comprises:
performing, multiple times, at least two safety functions among the two or more safety functions for the industrial robot based on at least one of the first position or the second position;
comparing outputs of the at least two safety functions from the multiple times that the at least two safety functions were performed; and
in a case that the outputs from at least one of the safety functions disagree, putting the industrial robot in a safe state; and wherein the two or more safety functions comprise:
a joint position limit safety function in which the second position sensor is configured to monitor an angle of the joint and to detect if the angle is beyond a predefined angle range, and in which the first position sensor is configured to calculate an output side position based on a number of full revolutions and gear ratio of the joint;
a joint speed limit safety function in which a speed of the joint is determined by a rate of change in position of the joint;
a joint torque limit safety function in which a position and a speed of the joint and a distribution of mass in the robot arm and a model of friction are used to calculate expected torque exerted in the joint;
a tool speed limit safety function in which a speed of a tool is determined based on output from the first position sensor and the second position sensor; and
a tool force limit safety function in which the expected torque is projected into Cartesian space to obtain a force limiting function.

* * * * *